United States Patent
Wang et al.

(10) Patent No.: US 10,422,583 B2
(45) Date of Patent: Sep. 24, 2019

(54) METHOD FOR RECYCLING RESIDUAL HEAT AND DUST IN FLUE GAS DURING RECLAIMED COPPER REFINING

(71) Applicants: Shandong Jinsheng Non-Ferrous Group Co., Ltd., Linyi, Shandong (CN); East Copper Company Ltd., Linyi, Shandong (CN)

(72) Inventors: Jinglian Wang, Linyi (CN); Chunyu Wang, Linyi (CN); Xianwei Zheng, Linyi (CN); Chunguang Chen, Linyi (CN); Xuexi Chen, Linyi (CN); Yanhua Wang, Linyi (CN); Yinchuan Wang, Linyi (CN); Ruixin Lv, Linyi (CN); Qinghuai Lv, Linyi (CN); Xiaodong Lu, Linyi (CN)

(73) Assignees: EAST COPPER COMPANY LTD., Shandong (CN); SHANDONG JINSHENG NON-FERROUS GROUP CO., LTD., Shandong (CN)

( * ) Notice: Subject to any disclaimer, the term of this patent is extended or adjusted under 35 U.S.C. 154(b) by 821 days.

(21) Appl. No.: 14/916,740

(22) PCT Filed: Aug. 12, 2014

(86) PCT No.: PCT/CN2014/084189
§ 371 (c)(1),
(2) Date: Mar. 4, 2016

(87) PCT Pub. No.: WO2015/032264
PCT Pub. Date: Mar. 12, 2015

(65) Prior Publication Data
US 2016/0216033 A1    Jul. 28, 2016

(30) Foreign Application Priority Data

Sep. 5, 2013    (CN) .......................... 2013 1 0400061

(51) Int. Cl.
   F27D 17/00          (2006.01)
   F28D 21/00          (2006.01)

(52) U.S. Cl.
   CPC ......... *F27D 17/004* (2013.01); *F27D 17/008* (2013.01); *F28D 21/0003* (2013.01); *Y02P 80/152* (2015.11)

(58) Field of Classification Search
   CPC ..................................................... F27D 17/004
   See application file for complete search history.

(56) References Cited

FOREIGN PATENT DOCUMENTS

| | | |
|---|---|---|
| CN | 1807253 | 7/2006 |
| CN | 202329228 | 7/2012 |
| CN | 103196300 | 7/2013 |
| CN | 103471402 | 12/2013 |
| JP | 2005321120 | 11/2005 |

OTHER PUBLICATIONS

ISR for PCT/CN2014/084189 completed Oct. 11, 2014.

*Primary Examiner* — Christopher S Kessler
(74) *Attorney, Agent, or Firm* — Schmeiser, Olsen & Watts LLP

(57) ABSTRACT

This invention provides a method for recycling residual heat and dust in flue gas during reclaimed copper refining that can be used for recycling of high-temperature residual heat and moderate and low-temperature residual heat with high recycling rate, complete dust recycling and low costs.

10 Claims, 1 Drawing Sheet

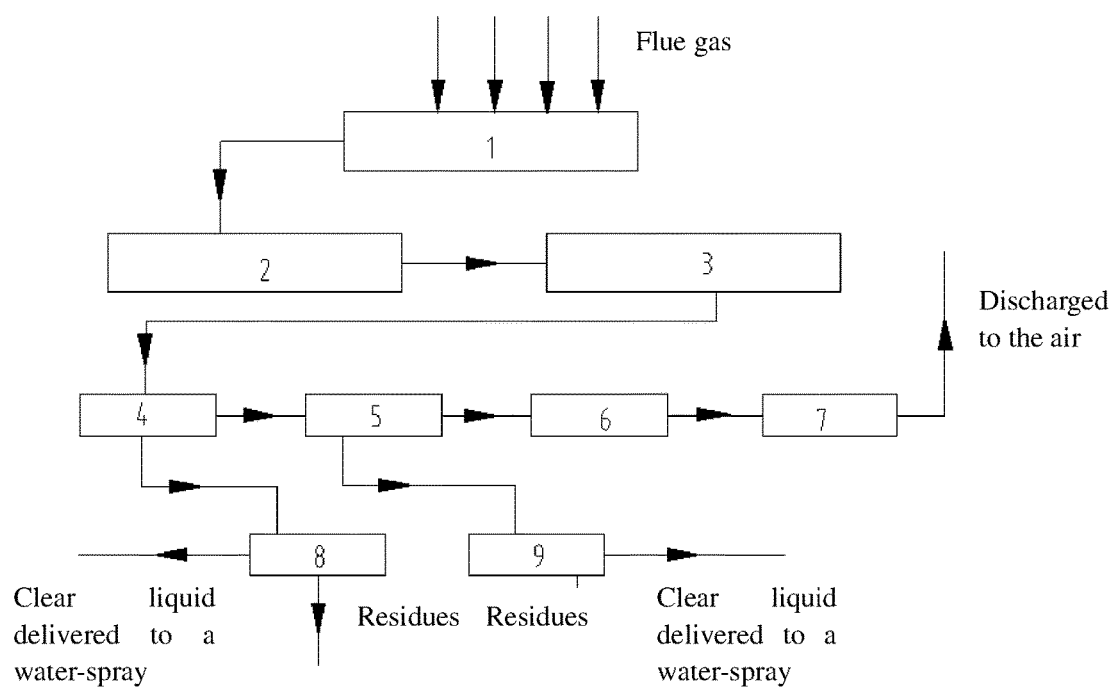

METHOD FOR RECYCLING RESIDUAL HEAT AND DUST IN FLUE GAS DURING RECLAIMED COPPER REFINING

FIELD OF THE INVENTION

The invention provides a method for recycling residual heat and dust in flue gas during reclaimed copper refining, relating to a method for residual heat utilization and exhaust gas treatment.

BACKGROUND OF THE INVENTION

Reclaimed copper refining is a process comprising the following: the blister copper and the scrap copper are used as raw materials to process and refine the refined copper with the copper content≥99.3%, then casting moulding, to make the copper ingots or anode plates.

The anode furnace operations for reclaimed copper refining include four stages: feeding, oxidation, reduction and casting. The temperature of the flue gas discharged in the oxidation stage is 1200~1300° C.; and the flue gas contains a large amount of dusts and carries semi-molten metal particles. During the reduction stage, the heavy oil is used as a reducing agent, to achieve a utilization rate less than 30%; the remaining will be discharged together with the flue gas, and the flue-gas temperature in the reduction stage is as high as 1400° C. During the reclaimed copper refining, flue gas may carry more than half of the total energy consumption of the metal smelting. Therefore, the residual heat carried by flue gas is valuable heat energy resource during the reclaimed copper refining and it is of great importance to recycle them for energy conservation. Besides, the recycling of the heat energy carried by flue gas in the reclaimed copper refining process is an important part for the enterprises to reduce energy consumption and production costs.

The large amount of flue gas and dust producing in the reclaimed copper refining process contains copper metal and other valuable elements. In order to enhance the smelting recycling rate, recycle the valuable elements and reduce environmental pollution, it is important for recycling of flue gas and dust, having important economic and environmental benefits.

In prior art, the recycling of residual heat in flue gas during reclaimed copper refining mainly adopts the residual heat boiler; and only the high-temperature residual heat is recycled, the moderate and low-temperature residual heat is not completely recycled, moreover, the heat exchange efficiency of traditional residual heat boilers is low. Therefore, the residual heat recycling rate is still low and some residual heat will be discharged to the air with the exhaust gas, which will not only waste energy sources, but also pollute the environment.

In prior art, the method for recycling dust in flue gas during reclaimed copper refining includes the dry dust recycling method and the wet dust recycling method. The dry dust recycling method is mainly used, but it has the shortcomings such as unstable process control, burning of bag collector, or blocking of bags, which may cause parking and seriously affect the sable production; besides, it has a high energy consumption and incomplete dust recycling; and it will cause environmental pollution when emissions of exhaust gas into the air.

It is expected to seek for an ideal method for recycling residual heat and dust in flue gas during reclaimed copper refining that can be used for recycling of high-temperature residual heat and moderate and low-temperature residual heat with high recycling rate, complete dust recycling and low costs.

SUMMARY OF THE INVENTION

The object of the invention is to overcome the shortcomings of prior art and provide a method for recycling residual heat and dust in flue gas during reclaimed copper refining that can be used for recycling of high-temperature residual heat and moderate and low-temperature residual heat with high recycling rate, complete dust recycling and low costs.

The object of the invention can be achieved through the following technical solutions:

In the present invention, a method for recycling residual heat and dust in flue gas during reclaimed copper refining, comprising a residual heat recycling apparatus and a dust recycling apparatus;

Wherein the residual heat recycling apparatus consists of a counterflow heat-exchange residual heat boiler A1, a counterflow heat-exchange residual heat boiler B2 and a working medium preheater 3 of a counterflow heat-exchange residual heat boiler;

The dust recycling apparatus consists of a water-spray scrubbing tower 4, a liquid membrane scrubber 5, an entrainment trapper 6, a draught fan 7, a settling filter A 8, and a settling filter B 9;

The residual heat recycling apparatus is connected with the dust recycling apparatus by pipelines of pipe fittings in sequence, and the recycling method comprises the following steps:

①. First-Level Residual Heat Recycling

The high temperature flue gas from reclaimed copper refining furnace enters the counterflow heat-exchange residual heat boiler A 1 and exchanges heat with the working medium in the boiler, to transfer the carrying high-temperature heat energy to the working medium in the boiler; the flue gas temperature is reduced to ≤700° C., to achieve the first-level residual heat recycling;

② Second-Level Residual Heat Recycling

The flue gas after step ① primary recycling of residual heat enters the counterflow heat-exchange residual heat boiler B2 and exchanges heat with the working medium in the boiler, to transfer the carrying moderate-temperature heat energy to the working medium in the boiler; the flue gas temperature is reduced to ≤450° C., to achieve the second-level residual heat recycling;

③. Third-Level Residual Heat Recycling

The flue gas after step ② secondary recycling of residual heat enters the working medium preheater 3 of the counterflow heat-exchange residual heat boiler and achieves counterflow heat exchange with the working medium preheater 4 of residual heat boiler, to transfer the carrying low-temperature heat energy to the working medium in the boiler; the flue gas temperature is reduced to ≤120° C., to achieve the third-level residual heat recycling;

④. Dust Recycling via Water Spray

The flue gas from the working medium preheater 3 of the counterflow heat-exchange residual heat boiler enters the bottom of the water-spray scrubbing tower 4, and countercurrent contacts with the water drops of spray atomization at the tower top during the ascending process, the dust enters the settling filter A8 with the washing water, to settle and filter to achieve solid-liquid separation, the washing water is delivered to the top of the scrubbing tower 4 for recycling and the filter residues are recycled; the flue gas after washing flows out from the top of the water-spray scrubbing tower 4;

⑤. Dust Recycling via a Liquid Membrane

After step ④ water spray, the flue gas from the water-spray scrubbing tower 4 enters the liquid membrane scrubber 5 to continue dust recycling, and enters the settling filter B9 to settle and filter to achieve solid-liquid separation, the aqueous phase is delivered to the top of the scrubbing tower 4 for recycling and the filter residues are recycled;

⑥. Entrainment Removal

The flue gas after the step ⑤ dust recycling via a liquid membrane enters the entrainment trapper 6 to remove the entrainment;

⑦. Emission of Exhaust Gas

After step ⑥ entrainment removal, the dust-free exhaust gas reaches the emission standard, to emit through a draught fan 7.

According to the thermodynamic principle, the most reasonable heat exchange way is counterflow heat exchange. Under the same heat exchange condition, the counterflow heat exchange can achieve a uniform temperature difference, to reduce the irreversible loss during the heat exchange; thus, the heat exchange rate is high. In the present invention, the inventor adopts the technical solution of counterflow heat exchange mode, which is important for solving the technical problems.

The methods of dust recycling via water spray and dust recycling via a liquid membrane are significantly superior to the prior art for recycling dusts. The exhaust emissions can meet the regulations on emissions in national standards.

The object of the invention can also be achieved through the following technical solutions:

The method for recycling residual heat and dust in flue gas during reclaimed copper refining, wherein the heat exchange between the flue gas in the residual heat recycling apparatus counterflow heat-exchange residual heat boiler A1, the counterflow heat-exchange residual heat boiler B 2 and the working medium preheater 3 of the counterflow heat-exchange residual heat boiler and the working medium of residual heat recycling in the boiler in steps ①, ②, ③ is achieved through a dual-tube type counterflow heat exchange mode, or a triple-tube type counterflow heat exchange mode; wherein:

For the dual-tube type counterflow heat exchange mode, the heat-exchange apparatus consists of several dual-straight-tube assemblies of different diameters, the flue gas flows along the central tube, the working medium of residual heat recycling flows along the annular tube in the opposite direction, to achieve the counterflow heat exchange;

For the triple-tube type counterflow heat exchange mode, the heat-exchange apparatus consists of triple-straight-tube assemblies of different diameters, the flue gas flows along the central tube and the outer annular tube and the working medium of residual heat recycling flows along the inner annular tube in opposite direction, to achieve the counterflow heat exchange.

It is a preferred technical solution.

The method for recycling residual heat and dust in flue gas during reclaimed copper refining, wherein the heat exchange between the flue gas in the residual heat recycling apparatus counterflow heat-exchange residual heat boiler A (1), the counterflow heat-exchange residual heat boiler B (2) and the working medium preheater (3) of the counterflow heat-exchange residual heat boiler and the working medium of residual heat recycling in the boiler in steps ①, ②, ③ is achieved through a dual-tube type counterflow heat exchange mode. The heat-exchange apparatus consists of several dual-straight-tube assemblies of different diameters, the flue gas flows along the central tube, the working medium of residual heat recycling flows along the annular tube in the opposite direction, to achieve the counterflow heat exchange.

It is a preferred technical solution.

The method for recycling residual heat and dust in flue gas during reclaimed copper refining, wherein the heat exchange between the flue gas in the residual heat recycling apparatus counterflow heat-exchange residual heat boiler A1, the counterflow heat-exchange residual heat boiler B2 and the working medium preheater 3 of the counterflow heat-exchange residual heat boiler and the working medium in the boiler in steps ①, ②, ③ is achieved through a triple-tube type counterflow heat exchange mode, the heat-exchange apparatus consists of several triple-straight-tube assemblies of different diameters, the flue gas flows along the central tube and the outer annular tube and the working medium of residual heat recycling flows along the inner annular tube in opposite direction, to achieve the counterflow heat exchange.

It is the optimal technical solution.

The method for recycling residual heat and dust in flue gas during reclaimed copper refining, wherein the heat exchange between the flue gas in residual heat recycling apparatus counterflow heat-exchange residual heat boiler A1 and the working medium of boiler residual heat recycling adopts dual-tube type counterflow heat exchange mode; the heat exchange between the flue gas in the counterflow heat-exchange residual heat boiler B2 and working medium preheater 3 of the counterflow heat-exchange residual heat boiler and the working medium in the boiler adopts triple-tube type counterflow heat exchange mode.

It is a preferred technical solution.

In the invention, the method for recycling residual heat and dust in flue gas during reclaimed copper refining, wherein the step ② second-level residual heat recycling in the recycling method of residual heat and dust carrying by the smelting flue gas with temperature≤1000° C. can be omitted. It is a preferred technical solution to save equipments.

The method for recycling residual heat and dust in flue gas during reclaimed copper refining, wherein the working medium of residual heat boiler or working medium of preheater is water or a low-boiling organic working medium.

The method for recycling residual heat and dust in flue gas during reclaimed copper refining, wherein it is used directly in the form of heat energy, or the recycled heat energy is converted to electric energy or mechanical energy.

Compared to prior art, the method for recycling residual heat and dust in flue gas during reclaimed copper refining has the following positive effects:

①. It provides a method for recycling residual heat and dust in flue gas during reclaimed copper refining that can be used for recycling of high-temperature residual heat and moderate and low-temperature residual heat with high recycling rate, complete dust recycling and low costs.

②. The recycled dust in flue gas contains copper and a variety of valuable elements, which can enhance the yield of blister copper smelting, recycle the valuable elements, achieving apparently economic benefits; besides, the exhaust gas emissions meet the national standard, protecting the environment for human survival.

③ It avoids the shortcomings such as unstable process control, burning of bag collector, or blocking of bags.

④. It adopts the counterflow heat exchange, enhancing the heat energy recycling rate. The residual heat recycling rate is ≥90%.

⑤. It saves the water and reduce energy consumption.

BRIEF DESCRIPTION OF THE DRAWINGS

FIG. 1 is the flow schematic of the method for recycling residual heat and dust in flue gas during reclaimed copper refining, wherein:
1. counterflow heat-exchange residual heat boiler A
2. counterflow heat-exchange residual heat boiler B
3. counterflow heat-exchange residual heat boiler working medium preheater
4. water-spray scrubbing tower
5. liquid membrane scrubber
6. entrainment trapper
7. draught fan
8. settling filter A
9. settling filter B

DETAILED DESCRIPTION OF THE EMBODIMENTS

The invention is further described in details in combination with embodiments.

Example 1

A method for recycling residual heat and dust in flue gas during reclaimed copper refining, comprising a residual heat recycling apparatus and a dust recycling apparatus;

Wherein the residual heat recycling apparatus consists of a counterflow heat-exchange residual heat boiler A1, a counterflow heat-exchange residual heat boiler B2 and a working medium preheater 3 of a counterflow heat-exchange residual heat boiler;

The dust recycling apparatus consists of a water-spray scrubbing tower 4, a liquid membrane scrubber 5, an entrainment trapper 6, a draught fan 7, a settling filter A8, and a settling filter B9;

The residual heat recycling apparatus is connected with the dust recycling apparatus by pipelines of pipe fittings in sequence, and the recycling method comprises the following steps:

① First-Level Residual Heat Recycling

The high temperature flue gas (1350° C.) from reclaimed copper refining furnace enters the counterflow heat-exchange residual heat boiler A1; the dual-tube type counterflow heat exchange mode is adopted; the heat-exchange apparatus consists of several dual-straight-tube assemblies of different diameters, the flue gas flows along the central tube, the working medium of residual heat recycling flows along the annular tube in the opposite direction, to achieve the counterflow heat exchange; it exchanges heat with the working medium in the boiler, to transfer the carrying high-temperature heat energy to the working medium in the boiler; the flue gas temperature is reduced to ≤700° C., to achieve the first-level residual heat recycling;

② Second-Level Residual Heat Recycling

The flue gas after step ① primary recycling of residual heat enters the counterflow heat-exchange residual heat boiler B2; the dual-tube type counterflow heat exchange mode is adopted; the heat-exchange apparatus consists of several dual-straight-tube assemblies of different diameters, the flue gas flows along the central tube, the working medium of residual heat recycling flows along the annular tube in the opposite direction, to achieve the counterflow heat exchange. The flue gas transfers the high-temperature heat energy to the working medium in the boiler; the flue gas temperature is reduced to ≤450° C., to achieve the second-level residual heat recycling;

③ Third-Level Residual Heat Recycling

The flue gas after step ② secondary recycling of residual heat enters the working medium preheater 3 of the counterflow heat-exchange residual heat boiler; the dual-tube type counterflow heat exchange mode is adopted; the heat-exchange apparatus consists of several dual-straight-tube assemblies of different diameters, the flue gas flows along the central tube, the working medium of residual heat recycling flows along the annular tube in the opposite direction, to achieve the counterflow heat exchange. The flue gas achieves counterflow heat exchange with the working medium preheater 4 of residual heat boiler, to transfer the low-temperature heat energy to the working medium in the preheater; the flue gas temperature is reduced to ≤120° C., to achieve the third-level residual heat recycling;

④. Dust Recycling via Water Spray

The flue gas from the working medium preheater 3 of the counterflow heat-exchange residual heat boiler enters the bottom of the water-spray scrubbing tower 4, and countercurrent contacts with the water drops of spray atomization at the tower top during the ascending process, and most dusts enter the settling filter A8 with the washing water, to settle and filter to achieve solid-liquid separation. The washing water is delivered to the top of the scrubbing tower for recycling and the filter residues are recycled; the flue gas after washing flows out from the top of the tower, to continue the recycling of dust;

⑤. Dust Recycling via a Liquid Membrane

After step ④ water spray, the flue gas enters the liquid membrane scrubber 5 to continue dust recycling, and enters the settling filter B9 to settle and filter to achieve solid-liquid separation. The aqueous phase is delivered to the top of the scrubbing tower for recycling and the filter residues are recycled;

⑥. Entrainment Removal

The flue gas after the step ⑤ dust recycling via a liquid membrane enters the entrainment trapper 7 to remove the entrainment;

⑦. Emission of Exhaust Gas

After step ⑥ entrainment removal, the dust-free exhaust gas reaches the emission standard, to emit through a draught fan (7).

Example 2

The method for recycling residual heat and dust in flue gas during reclaimed copper refining is in accordance with that in Example 1, with differences as follows:

In steps ①, ②, ③, the heat exchange between the flue gas in the residual heat recycling apparatus counterflow heat-exchange residual heat boiler A1, the counterflow heat-exchange residual heat boiler B2 and the working medium preheater 3 of the counterflow heat-exchange residual heat boiler and the working medium in the boiler is achieved through a triple-tube type counterflow heat exchange mode, the heat-exchange apparatus consists of several triple-straight-tube assemblies of different diameters, the flue gas flows along the central tube and the outer annular tube and the working medium of residual heat recycling flows along the inner annular tube in opposite direction, to achieve the counterflow heat exchange.

The recycling rate of residual heat is ≥95%. The exhaust gas emissions meet the national standards.

Example 3

The method for recycling residual heat and dust in flue gas during reclaimed copper refining is in accordance with that in Example 1, with differences as follows:

In step ①, the heat exchange between the flue gas in the residual heat recycling apparatus counterflow heat-exchange residual heat boiler A 1 and the working medium of residual heat recycling in the boiler a is achieved through a dual-tube type counterflow heat exchange mode. The heat-exchange apparatus consists of several dual-straight-tube assemblies of different diameters, the flue gas flows along the central tube, the working medium of residual heat recycling flows along the annular tube in the opposite direction, to achieve the counterflow heat exchange.

In steps ② and ③, the heat exchange between the flue gas in the counterflow heat-exchange residual heat boiler B, the working medium preheater 3 of the counterflow heat-exchange residual heat boiler and the working medium in the boiler is achieved through a triple-tube type counterflow heat exchange mode, the heat-exchange apparatus consists of several triple-straight-tube assemblies of different diameters, the flue gas flows along the central tube and the outer annular tube and the working medium of residual heat recycling flows along the inner annular tube in opposite direction, to achieve the counterflow heat exchange.

The recycling rate of residual heat is ≥93%. The exhaust gas emissions meet the national standards.

What is claimed is:

1. A method of recycling residual heat and dust in flue gas during reclaimed copper refining, the method comprising:
    first-level residual heat recycling, wherein flue gas, having a temperature higher than 700° C., from a reclaimed copper refining furnace, enters a first counterflow heat-exchange residual heat boiler, such that heat is transferred from the flue gas to a working medium of the first counterflow heat-exchange residual boiler, whereby the temperature of the flue gas is reduced to ≤700° C.;
    second-level residual heat recycling, wherein the flue gas thereafter enters a second counterflow heat-exchange residual heat boiler, such that heat is transferred from the flue gas to a working medium of the second counterflow heat-exchange residual boiler, whereby the temperature of the flue gas is reduced to ≤450° C.;
    third-level residual heat recycling, wherein the flue gas thereafter enters one of the working medium preheater of the first counterflow heat-exchange residual heat boiler or the working medium preheater of the second counterflow heat-exchange residual heat boiler, such that heat is transferred from the flue gas to a working medium of the respective working medium preheater, whereby the temperature of the flue gas is reduced to ≤120° C.;
    dust recycling via water spray, wherein the flue gas thereafter enters the bottom of a water-spray scrubbing tower and rises upward through the tower, wherein atomized water is sprayed from the top of the tower through the rising flue gas to collect dust from the flue gas, whereupon the water passes through a first settling filter to collect the dust from the water and is cycled back to the top of the tower to be atomized again in a repeating cycle, the residual dust is recycled from the first settling filter, and the flue gas rises out of the top of the tower;
    dust recycling via a liquid membrane, wherein the flue gas thereafter enters a liquid membrane scrubber where it passes through a liquid water membrane that further collects dust from the flue gas, whereupon the water passes through a second settling filter to collect the dust from the water and is cycled back to the top of the water-spray scrubbing tower to be atomized with the water of the dust recycling via water spray step, and the residual dust is recycled from the second settling filter;
    entrainment removal, wherein the flue gas thereafter enters an entrainment trapper where entrainment is removed from the flue gas by the entrainment trapper; and
    emission of exhaust gas, wherein the flue gas is emitted through a draught fan.

2. The method of claim 1, wherein the transfer of heat from the flue gas, during each of the first-level, second-level, and third-level heat recycling steps, is achieved through a dual-tube type counterflow heat exchanger.

3. The method of claim 1, wherein the transfer of heat from the flue gas, during each of the first-level, second-level, and third-level heat recycling steps, is achieved through a triple-tube type counterflow heat exchanger.

4. The method of claim 1, wherein the transfer of heat from the flue gas, during the first-level heat recycling step is achieved through a dual-tube type counterflow heat exchanger and heat from the flue gas during each of the second-level and third-level heat recycling steps is achieved through a triple-tube type counterflow heat exchanger.

5. The method of claim 1, wherein the transfer of heat from the flue gas, during each of the first-level, second-level, and third-level heat recycling steps, is achieved through a combination of at least one dual-tube counterflow heat exchanger and at least one triple-tube counterflow heat exchanger.

6. The method of claim 1, wherein the working medium of each of the first counterflow heat-exchange residual boiler, the second counterflow heat-exchange residual boiler, or the working medium of the working medium preheater of the first counterflow heat-exchange residual heat boiler or the second counterflow heat-exchange residual heat boiler, is water.

7. The method of claim 1, wherein the working medium of each of the first counterflow heat-exchange residual boiler, the second counterflow heat-exchange residual boiler, or the working medium of the working medium preheater of the first counterflow heat-exchange residual heat boiler or the second counterflow heat-exchange residual heat boiler, is an organic working medium having a boiling point temperature in the range from −15.5° C. to 35.3° C.

8. The method of claim 1, further comprising the step of using recycled heat from any of the first-level, second-level, or third-level heat recycling steps, as captured in the working medium thereof, in a direct application of heat energy.

9. The method of claim 1, further comprising the step of converting recycled heat from any of the first-level, second-level, or third-level heat recycling steps, as captured in the working medium thereof, to one of electrical energy or mechanical energy.

10. A method of recycling residual heat and dust in flue gas during reclaimed copper refining, the method comprising:
    first-level residual heat recycling, wherein flue gas, having a temperature higher than 700° C., from a reclaimed copper refining furnace, enters a first counterflow heat-exchange residual heat boiler, such that heat is transferred from the flue gas to a working medium of the first counterflow heat-exchange residual boiler, whereby the temperature of the flue gas is reduced to ≤1000° C.;
    second-level residual heat recycling, wherein the flue gas thereafter enters one of the working medium preheater of the first counterflow heat-exchange residual heat boiler or the working medium preheater of the second counterflow heat-exchange residual heat boiler, such that heat is transferred from the flue gas to a working medium of the respective working medium preheater, whereby the temperature of the flue gas is reduced to ≤120° C.;

dust recycling via water spray, wherein the flue gas thereafter enters the bottom of a water-spray scrubbing tower and rises upward through the tower, wherein atomized water is sprayed from the top of the tower through the rising flue gas to collect dust from the flue gas, whereupon the water passes through a first settling filter to collect the dust from the water and is cycled back to the top of the tower to be atomized again in a repeating cycle, the residual dust is recycled from the first settling filter, and the flue gas rises out of the top of the tower;

dust recycling via a liquid membrane, wherein the flue gas thereafter enters a liquid membrane scrubber where it passes through a liquid water membrane that further collects dust from the flue gas, whereupon the water passes through a second settling filter to collect the dust from the water and is cycled back to the top of the water-spray scrubbing tower to be atomized with the water of the dust recycling via water spray step, and the residual dust is recycled from the second settling filter;

entrainment removal, wherein the flue gas thereafter enters an entrainment trapper where entrainment is removed from the flue gas by the entrainment trapper; and emission of exhaust gas, wherein the flue gas is emitted through a draught fan.

* * * * *